United States Patent
Wang et al.

(10) Patent No.: US 12,513,573 B2
(45) Date of Patent: Dec. 30, 2025

(54) NETWORK RESOURCE REQUEST METHOD AND RELATED DEVICE THEREOF

(71) Applicant: HUAWEI TECHNOLOGIES CO., LTD., Guangdong (CN)

(72) Inventors: Fengbao Wang, Shanghai (CN); Shanshan Wang, Shanghai (CN); Ming Yu, Shanghai (CN); Jun Yang, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 400 days.

(21) Appl. No.: 18/338,976

(22) Filed: Jun. 21, 2023

(65) Prior Publication Data

US 2023/0354105 A1     Nov. 2, 2023

Related U.S. Application Data

(63) Continuation of application No. PCT/CN2021/139963, filed on Dec. 21, 2021.

(30) Foreign Application Priority Data

Dec. 23, 2020   (CN) .......................... 202011538882.9

(51) Int. Cl.
*H04L 41/122* (2022.01)
*H04L 41/04* (2022.01)
(Continued)

(52) U.S. Cl.
CPC ....... *H04W 28/24* (2013.01); *H04W 28/0226* (2013.01)

(58) Field of Classification Search
CPC .............. H04W 28/24; H04W 28/0226; H04L 41/122; H04L 41/0806; H04L 41/0853;
(Continued)

(56) References Cited

U.S. PATENT DOCUMENTS 10,516,583 B1 * 12/2019 Wakhare .............. H04L 41/5003
2010/0205295 A1 * 8/2010 Dietmayer .............. H04L 67/12
709/224
(Continued)

FOREIGN PATENT DOCUMENTS

CA     2751457 A1    9/2010
CN   101155196 A  *  4/2008
(Continued)

OTHER PUBLICATIONS

Extended European Search Report in European Appln No. 21909369.7, dated Mar. 15, 2024, 11 pages.
(Continued)

*Primary Examiner* — Moustafa M Meky
*Assistant Examiner* — Elizabeth Kassa
(74) *Attorney, Agent, or Firm* — Fish & Richardson P.C.

(57) ABSTRACT

The present disclosure relates to a network resource request method. An example method includes obtaining network intent information of a user, where the network intent information includes quantity information of a terminal device and service requirement information of the terminal device. The example method further includes performing classification representation on the network intent information based on an intent model, where the intent model includes a terminal device set, a service flow set, and a mapping relationship between the terminal device set and the service flow set. The example method further includes generating service level agreement (SLA) information based on a representation result of the intent model and sending the SLA information to an element management system.

20 Claims, 5 Drawing Sheets

(51) Int. Cl.
*H04L 41/0806* (2022.01)
*H04L 41/0853* (2022.01)
*H04L 41/5006* (2022.01)
*H04L 41/5019* (2022.01)
*H04L 47/70* (2022.01)
*H04L 47/76* (2022.01)
*H04W 28/02* (2009.01)
*H04W 28/24* (2009.01)

(58) Field of Classification Search
CPC ... H04L 41/145; H04L 41/5045; H04L 47/76; H04L 47/808; H04L 41/5006; H04L 41/5019; H04L 41/04; H04L 47/70; H04L 47/805
USPC .......................................................... 709/238
See application file for complete search history.

(56) References Cited

U.S. PATENT DOCUMENTS

| | | | |
|---|---|---|---|
| 2011/0258317 A1* | 10/2011 | Sinha | H04L 41/5054 709/226 |
| 2014/0365895 A1* | 12/2014 | Magahern | G06F 3/04842 715/762 |
| 2015/0007067 A1* | 1/2015 | Kang | G06F 8/38 715/762 |
| 2015/0293673 A1* | 10/2015 | Peters | G06F 3/0481 715/763 |
| 2015/0346986 A1* | 12/2015 | Prodhomme | G06F 8/10 715/763 |
| 2016/0034441 A1* | 2/2016 | Nguyen | G06F 40/137 715/234 |
| 2017/0193397 A1* | 7/2017 | Kottha | G06F 40/30 |
| 2018/0287891 A1* | 10/2018 | Shaw | H04W 24/02 |
| 2019/0141486 A1* | 5/2019 | Lu | H04W 8/22 |
| 2019/0174322 A1* | 6/2019 | Deviprasad | H04L 47/70 |
| 2020/0320407 A1 | 10/2020 | Xiao et al. | |
| 2021/0250251 A1* | 8/2021 | Fan | H04L 41/0816 |
| 2023/0105806 A1* | 4/2023 | Dunn | G06N 3/08 704/9 |

FOREIGN PATENT DOCUMENTS

| | | | | |
|---|---|---|---|---|
| CN | 101309214 A | | 11/2008 | |
| CN | 109417682 A | | 3/2019 | |
| CN | 111246586 A | * | 6/2020 | .......... H04W 72/542 |
| CN | 111416729 A | | 7/2020 | |
| CN | 111866953 A | * | 10/2020 | ............ H04W 72/53 |
| WO | WO-2019242664 A1 | * | 12/2019 | ......... H04L 12/4625 |

OTHER PUBLICATIONS

Office Action in Indian Appln. No. 202337039215, mailed on Jan. 1, 2025, 6 pages (with English translation).

3GPP TS 28.541 V17.1.0, "3rd Generation Partnership Project; Technical Specification Group Services and System Aspects; Management and orchestration; 5G Network Resource Model (NRM); Stage 2 and stage 3 (Release 17)," Dec. 2020, 456 pages.

3GPP TS 22.261 V17.5.0, "3rd Generation Partnership Project; Technical Specification Group Services and System Aspects; Service requirements for the 5G system; Stage 1 (Release 17)," Dec. 2020, 83 pages.

3GPP TS 22.104 V17.4.0, "3rd Generation Partnership Project; Technical Specification Group Services and System Aspects; Service requirements for cyber-physical control applications in vertical domains; Stage 1 (Release 17)," Sep. 2020, 76 pages.

International Search Report and Written Opinion in International Appln. No. PCT/CN2021/139963, mailed on Mar. 1, 2022, 16 pages (with English translation).

* cited by examiner

NETWORK RESOURCE REQUEST METHOD AND RELATED DEVICE THEREOF

CROSS-REFERENCE TO RELATED APPLICATIONS

This application is a continuation of International Application No. PCT/CN2021/139963, filed on Dec. 21, 2021, which claims priority to Chinese Patent Application No. 202011538882.9, filed on Dec. 23, 2020. The disclosures of the aforementioned applications are hereby incorporated by reference in their entireties.

TECHNICAL FIELD

This application relates to the field of communication technologies, and in particular, to a network resource request method and a related device thereof.

BACKGROUND

With continuous development of communication technologies, enterprise operation has higher requirements on network resources. Compared with a 2C network (which is a network directly facing public terminal users), a 2B network is a dedicated network oriented to enterprises, that is, a physical, logical, or virtual specific network deployed by a device vendor for the enterprises, to support communication requirements of the enterprises. For example, a 2B network is deployed for a game user group of a company, so that the game users obtain higher communication quality assurance when playing an online game.

The core of 2B network deployment is to determine a service level agreement (SLA) requirement based on an enterprise requirement. Then SLA requirement information is sent to an element management system. After receiving the SLA information, the element management system reserves network resources for a terminal device included in the 2B network. It may be understood that, because 2B network deployment and maintenance are human-centered, the entire 2B network deployment and maintenance are divided into different deployment phases based on division of labor, and different network intent requirements are generated in each deployment phase. Currently, once the terminal device generates a service requirement, the service requirement is converted into the SLA requirement, to request the element management system to reserve the network resources for the service requirement of the terminal device. In this way, a plurality of pieces of SLA requirement information are generated in the entire 2B network deployment, and the element management system needs to reserve the network resources once for each piece of SLA requirement information.

Due to the lack of sensing a network architecture and all service requirements of the entire 2B network, the element management system can only reserve the network resources mechanically for a plurality of times based on a single piece of SLA requirement information. However, terminal devices in the 2B network collaborate with each other, and each terminal device may perform a plurality of services. The single piece of SLA information cannot truly reflect the service requirement of the terminal device. As a result, the element management system cannot correctly reserve the network resources, and communication service quality of the 2B network is severely affected.

SUMMARY

Embodiments of this application provide a network resource request method and a related device thereof, to completely describe total service requirements of a terminal device in a 2B network by using an intent model, generate SLA information based on a description result, and send the SLA information to an element management system. In this way, the element management system can properly allocate and reserve network resources for the entire 2B network, to ensure communication service quality of the 2B network.

A first aspect of embodiments of this application provides a network resource request method, including:

When an enterprise needs to establish a 2B network for an operation project, the enterprise may reserve a network resource service from a carrier or a device vendor. The carrier or the device vendor inputs network intent information of a user through a management plane network element. The network intent information describes various service requirements generated by different terminal devices in a process of establishing the 2B network, and includes quantity information of the terminal device and service requirement information of the terminal device. Then, the management plane network element performs classification description on the network intent information based on the intent model. The intent model includes a terminal device set, a service flow set, and a mapping relationship between the terminal device set and the service flow set. It may be understood that the terminal device set is used to classify different terminal devices, and the service flow set is a collection of different types of service requirements. Then, service level agreement SLA information is generated based on a representation result of the intent model and is sent to an element management system. The element management system comprehensively deploys network resources of an access network for the 2B network of the user based on the SLA information.

In the network resource request method, the network intent information may be classified and described by using the intent model, to comprehensively describe the total requirements of the entire 2B network, and then the SLA information is generated based on a description result. In this way, the element management system may properly allocate the network resources of the access network based on the SLA information, to improve accuracy of network resource reservation and implement automatic network resource deployment.

In an optional implementation, the intent model further includes a geographical area set and a mapping relationship between the terminal device set and the geographical area set. The geographical area set describes a target geographical area of a local area network. In this way, the element management system may detect network resources (device resources) in the target geographical area, to deploy the local area network that is required by the user and that is in the target geographical area.

In an optional implementation, the intent model may describe the geographical area in two levels, in other words, the geographical area set may further include a sub-area set. The sub-area set is used to describe some areas of the target geographical area. In this way, through the description in the two levels, not only can a geographical area covered by the local area network be described for the element management system, but also location distribution of the terminal devices in the local area network in the geographical area can be described. In this way, the element management system can allocate the network resources more intelligently.

In an optional implementation, the terminal device set further includes a sub-device set. In other words, the terminal device set may be re-divided based on distribution of the terminal devices in the geographical area. It may be understood that there is a mapping relationship between the sub-device set and the sub-area set.

In an optional implementation, when requirements of the entire network are described based on the intent model, the terminal device may be classified based on the service requirement information of the terminal device, to be specific, service flows to be executed by the terminal devices in each terminal device set are consistent. In this way, the terminal device in the entire local area network can be described systematically. After the terminal device set is determined, a first identifier name may be established for each terminal device set, to mark the terminal device set, facilitating subsequent recording of a mapping relationship between the terminal device set and another set.

In an optional implementation, the service requirement information of the terminal device may be collected in the service flow set, to be specific, the service flow set is used to describe information and a parameter related to each service. Then, a second identifier name may be established for each service, to mark each service. In this way, a mapping relationship between the service and the terminal device set may be established by using the second identifier name.

In an optional implementation, the network intent information further includes geographical location information of the local area network. The geographical location information is used to describe a geographical location covered by the local area network. Then, related content in the geographical area set may be determined based on the geographical location information, to describe the target geographical area in detail. Finally, a third identifier name may be established for the geographical area set, and the third identifier name marks the geographical area set.

In an optional implementation, the network intent information further includes geographical location information of the terminal device. In this way, distribution of the terminal devices in the target geographical area may be determined based on the geographical location information of the terminal devices, and then a local sub-area of the target geographical area may be determined. Then, second location information of the local sub-area is described in the sub-area set. Finally, a third identifier name may be established for each sub-area set, and the third identifier name marks the sub-area set.

In an optional implementation, secondary division may be performed on the terminal device set based on the geographical location information of the terminal device in each terminal device set, to determine at least one sub-device set. Then, a fourth identifier name may be established for the sub-device set, and the fourth identifier name marks the sub-device set.

In an optional implementation, in each terminal device set, a target service that needs to be executed by the terminal device may be determined based on the service requirement information of the terminal device in the terminal device set. Then, the terminal device set is associated with the service flow set, to establish a correspondence between the first identifier name of the terminal device set and a second identifier name of the target service.

In an optional implementation, in each sub-device set, the sub-area set corresponding to the sub-device set may be determined based on the geographical location information of the terminal device included in the sub-device set. Then, a correspondence is established between the fourth identifier name of the sub-device set and the third identifier name of the sub-area set.

In an optional implementation, target quantity information of each terminal device set and/or each sub-device set may be further determined based on the quantity information of the terminal device.

In an optional implementation, the SLA information generated based on description content includes information about the terminal device set, information about the service flow set, information about the geographical area set, information about the mapping relationship between the terminal device set and the service flow set, and information about the mapping relationship between the terminal device set and the geographical area set. In this way, total requirements of the local area network to be deployed by the element management system may be comprehensively described for the element management system.

A second aspect of embodiments of this application provides a network resource request apparatus, including:

an obtaining unit, configured to obtain network intent information of a user, where the network intent information includes quantity information of a terminal device and service requirement information of the terminal device, and the network intent information is used to establish a local area network of the user;

a processing unit, configured to perform classification representation on the network intent information based on an intent model, where the intent model includes a terminal device set, a service flow set, and a mapping relationship between the terminal device set and the service flow set, where the terminal device set is used to classify the terminal device, and the service flow set represents the service requirement information;

a generation unit, configured to generate service level agreement SLA information based on a representation result of the intent model; and a sending unit, configured to send the service level agreement SLA information to an element management system, so that the element management system deploys network resources of an access network for the local area network of the user based on the SLA information.

In an optional implementation, the intent model further includes a geographical area set and a mapping relationship between the terminal device set and the geographical area set. The geographical area set represents a target geographical area of the local area network.

In an optional implementation, the geographical area set further includes a sub-area set. The sub-area set represents a local sub-area in the target geographical area.

In an optional implementation, the terminal device set further includes a sub-device set. The intent model further includes a mapping relationship between the sub-device set and the sub-area set.

In an optional implementation, the processing unit is specifically configured to: classify the terminal device based on the service requirement information of the terminal device, to determine the terminal device set, where service requirement information corresponding to each terminal device in the terminal device set is the same; and establish a first identifier name for the terminal device set, where the first identifier name marks the terminal device set.

In an optional implementation, the processing unit is specifically configured to: determine a plurality of services in the service flow set based on the service requirement information of the terminal device; and establish a second identifier name for each of the plurality of services, where the second identifier name marks the service.

In an optional implementation, the network intent information further includes geographical location information of the local area network. The processing unit is specifically configured to: determine first location information of the target geographical area in the geographical area set based on the geographical location information of the local area network; and establish a third identifier name for the geographical area set, where the third identifier name marks the geographical area set.

In an optional implementation, the network intent information further includes geographical location information of the terminal device. The processing unit is specifically configured to: determine second location information of the local sub-area in the sub-area set based on the geographical location information of the terminal device; and establish a third identifier name for the sub-area set, where the third identifier name marks the sub-area set.

In an optional implementation, the processing unit is specifically configured to: classify, in each terminal device set based on the geographical location information of the terminal device included in the terminal device set, the terminal device included in the terminal device set, to determine the sub-device set; and establish a fourth identifier name for the sub-device set, where the fourth identifier name marks the sub-device set.

In an optional implementation, the processing unit is specifically configured to: determine, in each terminal device set, a target service of the plurality of services based on the service requirement information of the terminal device included in the terminal device set; and establish a correspondence between the first identifier name of the terminal device set and a second identifier name of the target service.

In an optional implementation, the processing unit is specifically configured to: determine, in each sub-device set based on geographical location information of a terminal device included in the sub-device set, a sub-area set corresponding to the sub-device set; and establish a correspondence between the fourth identifier name of the sub-device set and the third identifier name of the sub-area set.

In an optional implementation, the processing unit is further configured to determine target quantity information of the terminal device set and/or the sub-device set based on the quantity information of the terminal device.

In an optional implementation, the SLA information includes information about the terminal device set, information about the service flow set, information about the geographical area set, information about the mapping relationship between the terminal device set and the service flow set, and information about the mapping relationship between the terminal device set and the geographical area set.

A third aspect of embodiments of this application provides a communication apparatus, including a processor. The processor is coupled to a memory. The memory is configured to store a program or instructions. When the program or the instructions is or are executed by the processor, the communication apparatus is enabled to implement the method in the first aspect or any possible implementation of the first aspect.

A fourth aspect of embodiments of this application provides a computer storage medium. The computer storage medium is configured to store computer software instructions used in the network resource request apparatus or the communication apparatus. The computer storage medium includes a program designed for executing the network resource request apparatus.

The network resource request apparatus may be the network resource request apparatus described in the second aspect.

A fifth aspect of this application provides a chip or a chip system. The chip or the chip system includes at least one processor and a communication interface. The communication interface and the at least one processor are interconnected through a line. The at least one processor is configured to run a computer program or instructions, to perform the network resource request method described in the first aspect or any one of possible implementations of the first aspect.

The communication interface in the chip may be an input/output interface, a pin, a circuit, or the like.

In a possible implementation, the chip or the chip system described in this application further includes at least one memory. The at least one memory stores instructions. The memory may be a storage unit inside the chip, for example, a register or a cache, or may be a storage unit (for example, a read-only memory, a random access memory) of the chip.

A sixth aspect of embodiments of this application provides a computer program product. The computer program product includes computer software instructions. The computer software instructions may be loaded by a processor to implement any procedure in the network resource request method in the first aspect.

DESCRIPTION OF EMBODIMENTS

Figure 1:
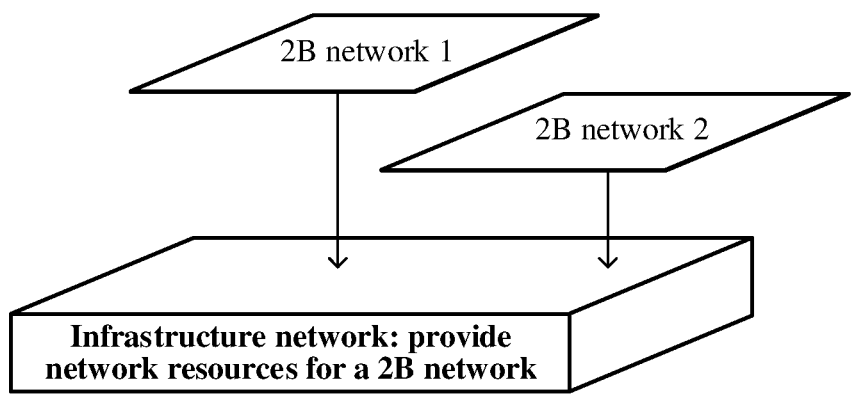
FIG. 1 is a schematic diagram of a 2B network deployment scenario according to an embodiment of this application.

Embodiments of this application provide a network resource request method and a related device thereof, to completely describe total service requirements of a terminal device in a 2B network by using an intent model, generate SLA information based on a description result, and send the SLA information to an element management system. In this way, the element management system can properly allocate and reserve network resources for the entire 2B network, to ensure communication service quality of the 2B network.

The following describes technical solutions in this application in detail with reference to the accompanying drawings in this application. It is clear that the described embodiments are merely a part of rather than all of embodiments of this application.

In the specification, claims, and accompanying drawings of this application, the terms "first", "second", "third", "fourth", and the like (if used) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

A 2B network is a concept proposed compared with a 2C network. The 2C network is a network directly facing public terminal users, while the 2B network is a dedicated network facing enterprises. A device vendor or a carrier deploys a physical, logical, or virtual specific network for enterprises, and reserves proper network resources for the network, to ensure communication requirements of the enterprises. For example, the device vendor may establish a dedicated 2B network for a specific enterprise and reserve network resources needed for the enterprise, to ensure communication requirements of automatic control, remote operation, and environmental monitoring of a terminal device on a specific production line of the enterprise. For another example, the carrier establishes a dedicated game network for a game of a specific game company, and provides abundant network resources for the game company, so that network users of the game can enjoy a faster network speed and clearer interface display, and a higher communication assurance is obtained.

The core of 2B network deployment is to determine a service level agreement (SLA) requirement based on an enterprise requirement. Then SLA requirement information is sent to an element management system. After receiving the SLA information, the element management system reserves the network resource for a terminal device included in the 2B network, so that a communication service of a terminal device of the enterprise is not affected by a communication surge load of another user. In other words, 2B network deployment means reserving resources on an infrastructure network for a specific project requirement. Specifically, one 2B network may be carried on one infrastructure network, and exclusively use all network resources on the infrastructure network. Alternatively, a plurality of 2B networks may be carried on one infrastructure network, and share network resources on the infrastructure network. The network resource on the infrastructure network may ensure communication requirements of the plurality of 2B networks.

Figure 2:
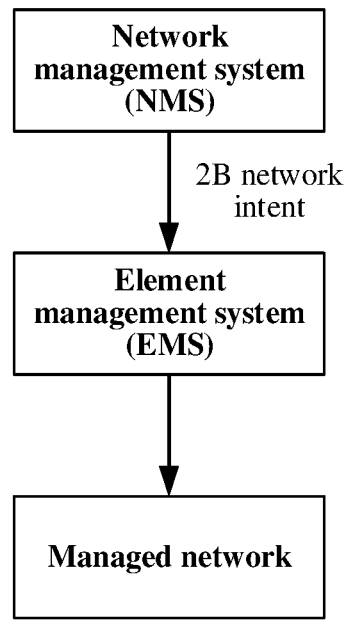
FIG. 2 is a network architectural diagram of 2B network deployment according to an embodiment of this application.

FIG. 1 is a schematic diagram of a 2B network deployment scenario according to an embodiment of this application. As shown in FIG. 2, a plurality of 2B networks are carried on one infrastructure network, and share network resources of the infrastructure network. For an access network (the infrastructure network), there may be the following types of sharing forms.

A first type is a 2B network in a radio resource (RB) reservation manner. For example, the infrastructure network is a 5G network, and includes a plurality of 5G base stations and cells, to implement coverage of a specific area. Therefore, some RB resources may be reserved in these 5G base stations and cells for a specific 2B user in the area, to ensure a special communication requirement of the user. It may be understood that a plurality of 2B networks may be created in the RB reservation manner in one 5G network.

A second type is a 2B network of an independent logical network. For example, a 5G network-gNodeB and a corresponding cell thereof are created on a physical network (a device or a transport network) for the specific 2B user. The 2B user exclusively occupies a related cell. A plurality of 5G networks-gNodeBs and corresponding cells thereof may be created on a physical node. Therefore, in this case, physical network resources are partially shared, but spectrums are generally exclusively used by each 2B network.

A third type is a 2B network with independent physical resources. In this case, physical facilities and logical resources in the infrastructure network are completely independently established for the 2B network. For example, a completely independent network may be independently deployed for a factory based on the infrastructure network.

It may be understood that, regardless of the type of the 2B network, network resources evaluated and reserved for 2B network deployment may include the following types.

A first type is a radio resource. Reservation of the resource may ensure that quality of a radio signal in a coverage area meets a quality requirement of the 2B network. For example, if a throughput rate requirement of the 2B network is higher, the quality of the radio signal of the 2B network should be higher. For example, for the 2B network with the independent physical resources, a remote radio unit (RRU) device may be re-deployed for area coverage. Both an installation location of an RRU and a quantity of RRUs may affect the quality of the radio signal within the coverage area.

A second type is a transmission resource. It may be understood that, after being received through a radio frequency signal, the communication information of the 2B network is finally converted into information transmitted between processing nodes in a base station device and information transmitted between a base station and a core network. Therefore, the transmission resource needs to be evaluated and reserved. In addition, a corresponding transmission priority and the like need to be allocated to the 2B network based on a reliability requirement of service quality of the 2B network. For example, for the 2B network with the independent physical resources, a transmission topology relationship, for example, a chain connection between RRUs, needs to be planned.

A third type is a device resource. For communication signals of user equipment (UE) and customer premise equipment (CPE) that are included in the 2B network, signal processing needs to be performed in a hierarchical manner in the base station. Therefore, whether processing capabilities of processing boards in the infrastructure network meet a requirement needs to be evaluated and reserved. For example, for the 2B network with the independent physical resources, a quantity of main control boards, a quantity of baseband processing boards, a quantity of radio frequency boards, and the like need to be planned.

It may be understood that, to ensure that the core network reserves abundant network resources for the 2B network that needs to be deployed, a requirement of the 2B network needs to be described first. Then, the core network needs to learn of the 2B network based on the description. Finally, the core network can allocate and deploy the network resources based on the requirement. FIG. 2 is a network architectural diagram of 2B network deployment according to an embodiment of this application. As shown in FIG. 2, the network architectural diagram may include an upper-layer network management system (NMS), a lower-layer element management system (EMS), and a managed infrastructure network.

Specifically, the NMS describes 2B network intents, that is, various requirements included in a needed 2B network. It may be understood that the function may alternatively be implemented through a network slice management function (NSMF). Then, the NMS sends the described network intent to the EMS. The EMS performs parsing and resource planning on the network intent, and finally determines a quantity of network resources reserved for the 2B network to meet a communication requirement of the 2B network. It may be understood that the function may alternatively be implemented through a network slice subnet management function (NSSMF). Finally, a configuration command for reserving resources is delivered to the managed infrastructure network. Then the managed infrastructure network constructs a network based on the configuration command, to enable the 2B network and finally complete network construction. Therefore, the description of the 2B network intent (requirement) is a prerequisite for deploying the 2B network.

The following describes in detail a method for describing the 2B network intent.

A network intent describes service requirements of the network, that is, describes which terminal devices in the 2B network perform communication services in areas. The network intent does not describe how to implement these requirements, but is only used to transmit a service requirement status of the terminal device in the 2B network to a core network. When the core network receives the network intent, an intelligent module in a system can automatically allocate, based on a detected network resource status and according to a network allocation policy, network resources managed by the intelligent module to the 2B network, and in a subsequent network running process, automatically retain and maintain network resources required by the 2B network, to continuously ensure that a communication service of the terminal device in the 2B network meets a requirement in the network intent. It may be understood that the core of the network intent is to implement automatic resource allocation.

Existing deployment and maintenance of the 2B network are centered on work of people, where for example, include several operation phases, such as a planning phase, a deployment phase, a maintenance phase, and an optimization phase. Each phase corresponds to a plurality of different fields and different tools, to support different operations performed by a person in different operation phases. It may be understood that each tool in each phase corresponds to different communication requirements. The network management system needs to learn of a communication requirement of each tool in each phase and reserves abundant network resources for the requirements to ensure smooth 2B network deployment. Because a current communication protocol does not have a unified and comprehensive definition of a network requirement, the service requirements are scatteredly input to the network management system based on requirements of each tool in different operation phases. In other words, in each phase of the deployment and maintenance of the 2B network, once a service requirement is generated by a specific tool in the phase, the service requirement is converted into a network intent and input to the network management system. The network management system reserves network resources for the network intent. As a result, a process of network resource reservation is scattered, and complete network planning and network resource deployment cannot be performed for the entire 2B network, leading to a waste of the network resources. In addition, scattered descriptions of the network intent cannot accurately describe requirements of the entire 2B network. Because the terminal devices included in the 2B network collaborate with each other, scattered network intent input for a specific requirement of a specific terminal device enables the network management system to sense a collaborative relationship between the terminal devices. This may also lead to insufficient network resources to be reserved, and finally cannot ensure the communication requirement of the 2B network.

A 3GPP network protocol defines the description of the network intent. A service profile or slice profile includes a type of UEs (terminal devices). The type of UEs has only one common SLA quality. In other words, it is not supported that the UEs included in the service profile or slice profile are grouped, and it is default that all UEs are evenly distributed in a coverage area corresponding to the service profile or slice profile. In addition, it is not supported that resources required by the UEs are different due to distribution of the UEs in different areas, and distribution density of the UEs cannot be defined. In addition, all the UEs have only one common SLA quality. In other words, all the UEs support only one service flow, and a plurality of service flows corresponding to the UE cannot be described. It may be understood that if a specific UE corresponds to a plurality of service flows and a plurality of pieces of SLA quality, the UE can be distributed only in a plurality of service profiles or slice profiles for description. Then, the service profile or slice profile is separately input into the network management system. The network management system separately performs resource evaluation and reservation on each service profile or slice profile. This easily leads to improper allocation and deployment of the network resources. Therefore, a more proper and comprehensive network intent description method is urgently needed.

An embodiment of this application provides a new network resource request method, to describe total service requirements of a terminal device in a 2B network by using a complete intent model, generate SLA information based on a description result, and send the SLA information to an element management system. In this way, the element management system can properly deploy network resources based on a communication requirement of the entire 2B network. Before the intent model is described, content that should be included in the total requirements of the 2B network is first described.

Figure 3:
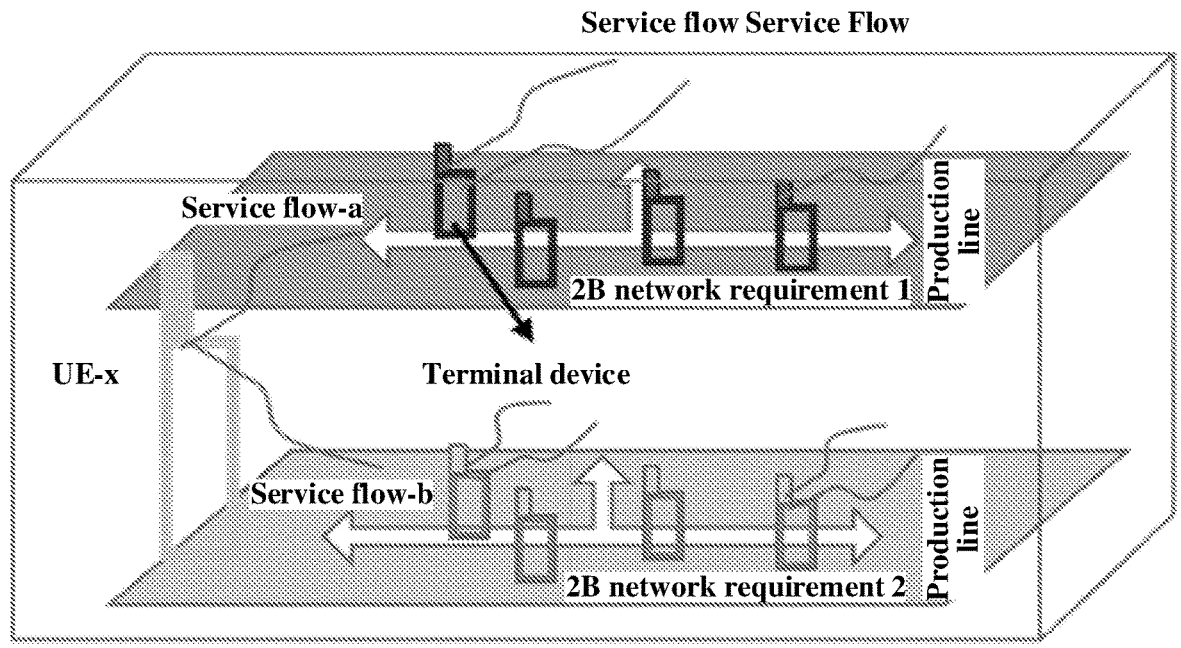
FIG. 3 is a schematic diagram of a 2B network deployment scenario according to an embodiment of this application.

FIG. 3 is a schematic diagram of a 2B network deployment scenario according to an embodiment of this application. As shown in FIG. 3, in a network slice subnet instance (NSSI), an enterprise includes two production lines. Each production line may generate a 2B network requirement, and an element management system is needed to deploy a 2B network for each production line. Each production line includes a plurality of terminal devices. Each terminal device corresponds to a service flow (a requirement). It may be understood that there may be one or more service flows corresponding to each terminal. The service flow corresponding to the terminal device on each production line may be the same or different. In addition, there is a terminal device shared by two service flows, and there are also a plurality of service flows on the terminal device. It may be understood that to describe the 2B network requirement corresponding to each production line comprehensively and properly, the following aspects need to be described.

First, a quantity of UEs included in a production line needs to be described, and a 2B network intent corresponding to the production line should describe all UEs. For example, the UEs may be grouped into a plurality of UE groups according to a classification policy. Because these UE groups serve one production line, the plurality of UE groups need to be described in one 2B network intent, so that the system performs centralized and unified resource allocation and assurance for these UE groups.

Second, one or more service flows service flows to be used by each UE need to be described. It may be understood that, to describe the entire 2B network intent completely and accurately, if the UE uses the plurality service flows, the service flows needs to be clearly expressed in one 2B network intent, and cannot be described separately in two network intents. Because the element management system can reserve network resources only for one network intent, and cannot recognize a relationship between the UEs in two network intents, an SLA requirement that a specific UE in one network intent corresponds to two service flows and an SLA requirement that a specific UE implements one service flow in two network intents are completely different SLA requirements. As shown in FIG. 3, UE-x is a device shared by two production lines, and two service flows are executed for different production lines. If requirements of the two service flows are separately described in two 2B network requirements slice profiles, the network resource reserved by the element management system for the two service flows can only ensure an SLA when the UE-x executes service flow-a, and can also ensure an SLA when the UE-x executes service flow-b. However, when the UE-x executes both service flow-a and service flow-b, the SLA corresponding to the UE-x cannot be ensured. This is because two service requirements of the UE-x are separately transferred to the system. The system cannot recognize that the two service requirements are from a same UE, and considers by default that the UEs in the two network requirements are different UEs. Consequently, the system cannot reserve abundant resources for a scenario in which the UE-x simultaneously executes service flow-a and service flow-b. Therefore, to ensure the service requirement, a service flow to be executed by the UE needs to be completely described in the network intent.

Finally, geographical distribution of each UE may be further described. Because under a same SLA requirement, different UE distribution manners have different requirements on the network resources, and the geographical distribution also affects system deployment and network resource retaining.

Figure 4:
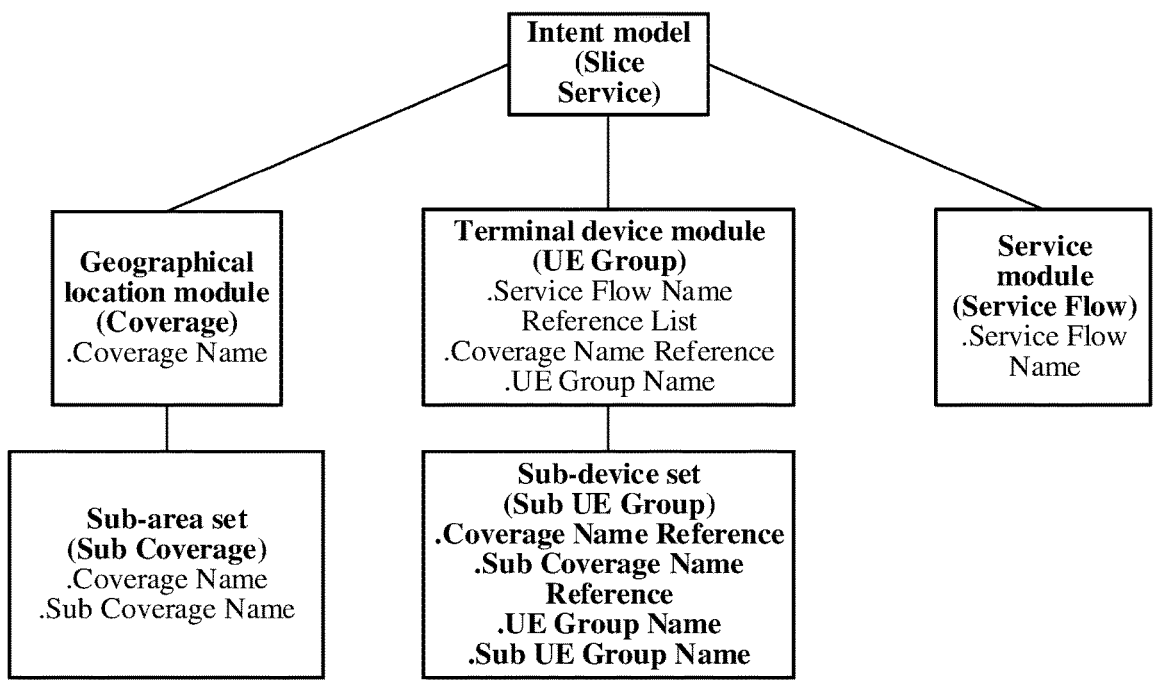
FIG. 4 is a schematic diagram of a structure of an intent model according to an embodiment of this application.

Based on the foregoing content, FIG. 4 is a schematic diagram of a structure of an intent model according to an embodiment of this application, to completely describe a 2B network intent. As shown in FIG. 4, the intent model slice service includes a geographical location module coverage, a terminal device module UE group, and a service module service flow. Content of each module in the model is used to classify and describe a customer requirement of a 2B network, to accurately and completely transfer an SLA requirement of the 2B network to the element management system. This ensures that the system properly allocates network resources to the 2B network, and supports management (deployment and maintenance) of a lifecycle of the entire network.

The following describes the foregoing three modules separately.

(1) Terminal Device Module UE Group:

The module describes a terminal device included in the 2B network. When the 2B network is comprehensively described, a plurality of UE groups (terminal device sets) may be defined in one network intent. In other words, all UEs may be classified based on a service requirement corresponding to each UE, and UEs with a same service requirement are classified and described in a same UE Group. In addition, an object identifier field (a first identifier name) UE group name may be determined for each UE group, to distinguish between the UE groups. It may be understood that because the UE group is classified based on a service, when a terminal includes a plurality of service requirements, the terminal may belong to different UE groups.

Because UEs in one "service slice" collaborate with each other, there is a "transaction association" between the UEs. For example, in the scenario shown in FIG. 3, the UEs in one production line may perform different service operations and correspond to different SLA requirements. If there is any communication failure between the UEs, the entire production line is shut down. Therefore, all related UE groups on one production line need to be described in one 2B network intent to reflect a collaboration association between the UEs. In this way, when receiving the network intent, the system can sense the "transaction association" between the UEs in the entire 2B network. In this way, the system deploys and reserves the network resources to ensure a communication requirement of the entire 2B network.

(2) Service Module Service Flow:

The service module uniformly describes a service flow service flow in an entire "service slice". In a 2B network, each UE corresponds to one or more service flows. Because a plurality of service flows affect each other, all service flows corresponding to each UE need to be clearly described in a 2B network intent. For example, in the scenario shown in FIG. 3, the UE-x corresponds to two service flows. If requirements of the two service flows are separately described in two network intents, the network can ensure the SLA of the UE-x when the UE-x executes only service flow-a, and can also ensure the SLA when the UE-x executes only service flow-b. However, when service flow-a and service flow-b are executed simultaneously, the SLA cannot be ensured. This is because the element management system considers by default that there is no association between the two network intents. The element management system can allocate and reserve resources for the UE only based on a request in a network intent, but cannot sense that the service requirements correspond to a same UE. Therefore, during network intent description, all service flows corresponding to all the UEs in the "service slice" need to be described in detail.

As a service flow set, the service module describes an SLA parameter corresponding to each service flow and may determine a service flow name for each service flow for distinguishing. In other words, the service module describes all service flows in detail.

(3) Geographical Location Module Coverage:

After the terminal device module UE Group and the service module service flow are determined, geographical location distribution of the UEs further needs to be described. It may be understood that the entire 2B network intent is intended to express "which UEs perform services in areas". Therefore, the geographical location module coverage describes information about a geographical location of the entire 2B network. It may be understood that even through geographical location information of an area to be covered by the entire 2B network is learned of, different distribution of the UEs in the area has a great impact on the SLA. For example, more network resources need to be planned and deployed in a place in which the UEs are densely distributed. Therefore, a distribution status of the UEs in an entire geographical area needs to be accurately described. In a preferred embodiment, the geographical location area is divided into a plurality of sub-areas.

For example, as shown in FIG. 4, the intent model includes a plurality of sub-area sets sub coverage for describing some geographical areas in a coverage area corresponding to the 2B network. A division basis of the intent model is a distribution status of the UEs in the coverage area. It may be understood that when area division is performed on the coverage area, secondary division needs to be performed on the UE in each UE group. In other words, the intent model includes a plurality of sub-device sets sub UE groups for reclassifying the UE group.

It may be understood that the intent model describes the geographical area in two levels. A first level describes geographical location information of a total coverage area of the entire 2B network. A second level reflects a distribution density difference of the UE in the area. Therefore, the UE group corresponds to the coverage, and the sub UE group corresponds to the sub coverage. Because the sub-area set may be used only for some areas of the geographical location area, the sub-device set sub UE group may not be a complete subset of the UE group. For example, a UE group object is defined to correspond to a coverage object, and there are 100 UEs in the UE group. When there is only one sub coverage under the coverage object, only one sub UE group may be defined under the UE group, and a quantity of UEs corresponding to the sub UE group is 10. It may be understood that the sub UE group corresponds to the sub coverage. In other words, an area defined by the sub coverage includes 10 UEs. Therefore, it is reflected that the remaining 90 UEs are distributed outside the area defined by the coverage.

After description content corresponding to each module is determined based on the intent model, the modules need to be associated. In other words, relationships among the UE, the service flow, and the coverage need to be determined. In other words, which service flows are executed by the UEs in each UE group and geographical location distribution statuses of the UEs. It may be understood that, based on the association relationships and modules, associations in the entire 2B network can be clearly expressed, and service requirements of the entire 2B network can be completely described. In this way, the element management system can perform network deployment more intelligently and accurately, and reserve proper resources to maintain the entire 2B network.

For example, a service flow name reference list field in the UE group may be used to reference a plurality of service flow objects. The reference indicates that all UEs in the UE group execute the plurality of service flows simultaneously, that is, perform a plurality of communications simultaneously, for example, video surveillance and industrial control. A value of the service flow name reference list field may be a service flow name of each service flow in the service module. It can be learned from the foregoing description that there is a one-to-many relationship between the UE group and the service flow.

For example, the coverage object may be managed by using a coverage name reference field in the UE group. This reference indicates that all the UEs in the UE group are located in a coverage area corresponding to the coverage. A value of the coverage name reference field may be a coverage name (a third identifier name). The coverage name marks the coverage.

When the coverage further includes a plurality of sub coverage, a sub coverage name (a fourth identifier name) may be determined for each sub coverage, to mark the sub coverage. Then, a correspondence between the coverage name and the sub coverage name may be established, to indicate that the sub-area is included in the coverage area defined by the coverage. In this case, the UE group corresponds to the sub UE group. Similarly, a sub UE Group name (a fifth identifier name) may be determined for each sub UE group, to mark the sub UE group. A correspondence between the UE group name and the sub UE group name is established, to indicate that the sub-device set is included in the UE group.

Then, a relationship between the sub UE group and the sub coverage needs to be established. In other words, a sub coverage reference field in the sub UE group may be used to reference the sub coverage object. This reference indicates that all the UEs in the sub UE group are in the sub-area defined by the sub coverage. In this way, the total requirements of the 2B network can be completely described through one network intent based on content described by each module and mapping relationships between the modules.

Figure 5:
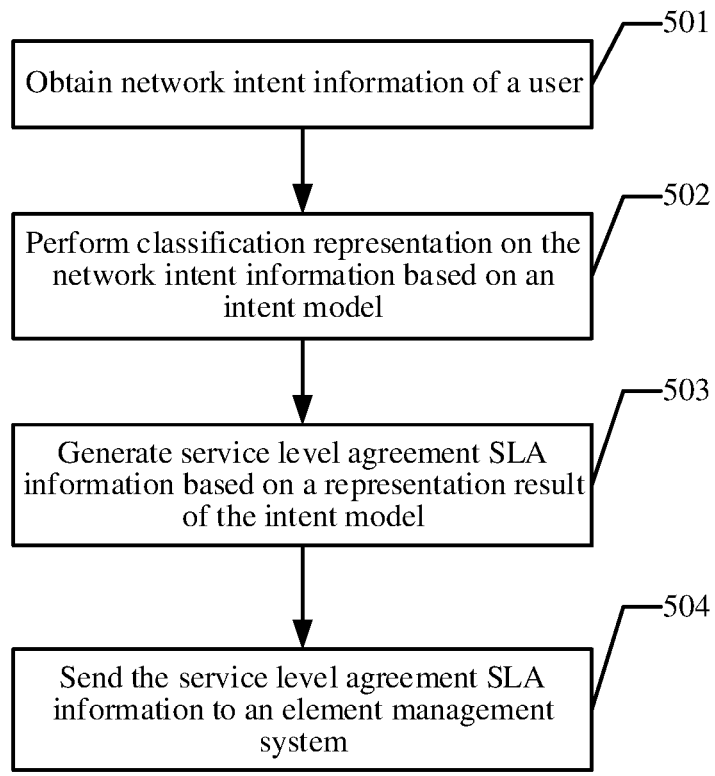
FIG. 5 is a schematic flowchart of a network resource request method according to an embodiment of this application.

Based on the intent model, FIG. 5 is a schematic flowchart of a network resource request method according to an embodiment of this application. The method includes the following steps.

501: Obtain network intent information of a user.

It may be understood that a 2B network deployment process includes a plurality of operation phases, and each tool in each operation phase has scattered service requirements. Therefore, the network intent information needs to be collected and obtained for subsequent systematic and comprehensive description. The information may include quantity information of a type of terminal devices and service requirement information of the type of terminal devices. The information is a prerequisite for establishing a 2B network.

502: Perform classification representation on the network intent information based on an intent model.

After a large amount of the network intent information is collected, the network intent information may be classified and described based on the intent model, to form a systematic and comprehensive network intent. Then, the network intent is sent to an element management system at a time, so that the element management system comprehensively learns of an overall picture of the 2B network to be established. It may be understood that the intent model may be the intent model shown in FIG. 4. A network management system comprehensively describes the 2B network based on a terminal device set, a service flow set, and the like that are included in the intent model, and needs to determine a mapping relationship between modules.

503: Generate service level agreement SLA information based on a representation result of the intent model.

After describing the 2B network systematically and comprehensively, the network management system may convert the service requirement into an SLA requirement based on description content, and report the SLA requirement to the element management system. The element management system may provide data for the 2B network and reserve network resources of an access network based on the requirement.

504: Send the service level agreement SLA information to the element management system.

According to the request method, total requirements of the entire 2B network may be comprehensively described. This is a prerequisite for the element management system to properly allocate the network resources. Accuracy of network resource reservation is improved, and automatic network resource deployment is implemented, improving user experience.

The following describes a deployment procedure of the element management system briefly.

Figure 6:
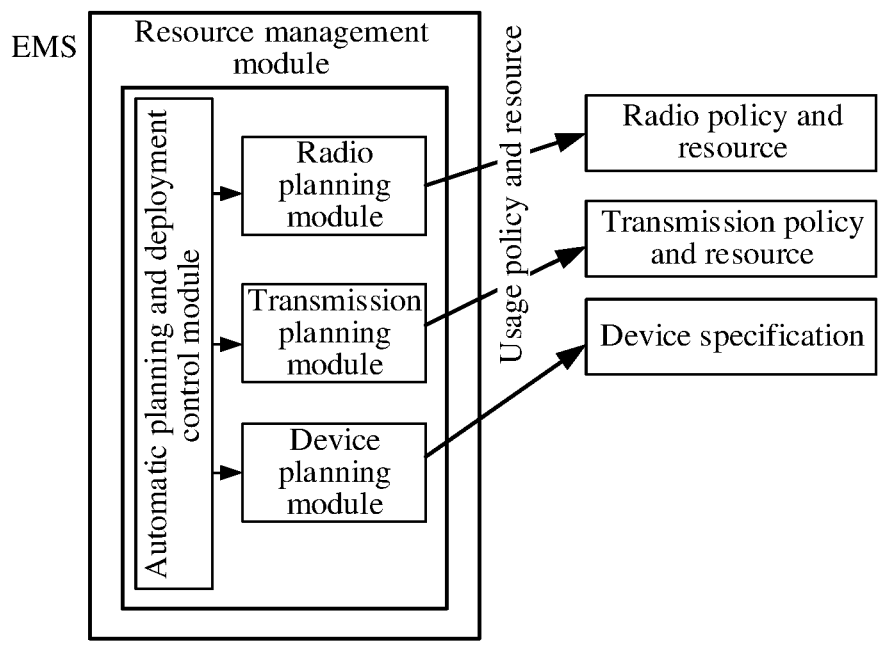
FIG. 6 is a schematic diagram of a structure of an element management system EMS according to an embodiment of this application.

FIG. 6 is a schematic diagram of a structure of an element management system EMS according to an embodiment of this application. As shown in FIG. 6, a resource management module is deployed in the EMS. The resource management module includes an automatic planning and deployment control module (which may also be referred to as a control module or a control apparatus), a radio planning module (which may also be referred to as a radio planning apparatus), a transmission planning module (which may also be referred to as a transmission planning apparatus), and a device planning module (which may also be referred to as a device specification apparatus).

The radio planning module may obtain a preset radio planning policy. The radio planning policy may provide radio resources used for service transmission between a signal processing apparatus and a terminal device. Reservation of the resources ensures that signal quality of radio coverage in a coverage area meets a quality requirement of a 2B network. For example, if a throughput rate of the 2B network is higher, quality of a radio signal is higher. For the 2B network with independent physical resources, a remote radio unit (RRU) device needs to be re-deployed for area coverage. An installation location of the RRU and a quantity of RRUs determine and distinguish the signal quality in the coverage area.

The transmission planning module may obtain a preset transmission planning policy. The transmission planning policy may provide transmission resources for an access network device. After being received through a radio frequency signal, the communication information of the 2B network is finally converted into information transmitted between processing nodes in the access network device and information (which may also be referred to as a service) transmitted between the access network device and a core network device. Therefore, the transmission resources need to be evaluated and reserved. In addition, a corresponding transmission priority and the like are allocated based on a reliability requirement of service quality of the 2B network. For the 2B network with the independent physical resources, a transmission topology, for example, a chain connection between RRUs, needs to be planned.

The device planning module may obtain a preset device planning policy. The device planning policy may provide a quantity of signal processing apparatuses and a connection relationship between the signal processing apparatuses. For a communication signal of the terminal device in the 2B network, signal processing needs to be performed in a hierarchical manner in the access network device. Therefore, whether a processing capability of a processing board meets a requirement needs to be evaluated and reserved. For example, for the 2B network with the independent physical resources, a quantity of main control boards, a quantity of baseband processing boards, a quantity of radio frequency boards, and the like need to be planned.

After receiving the SLA information, the EMS needs to parse the SLA information and analyze network requirements corresponding to the entire 2B network. Then, the modules of the EMS coordinate with each other to deploy, based on the requirements, the 2B network requested in a network intent.

Figure 7:
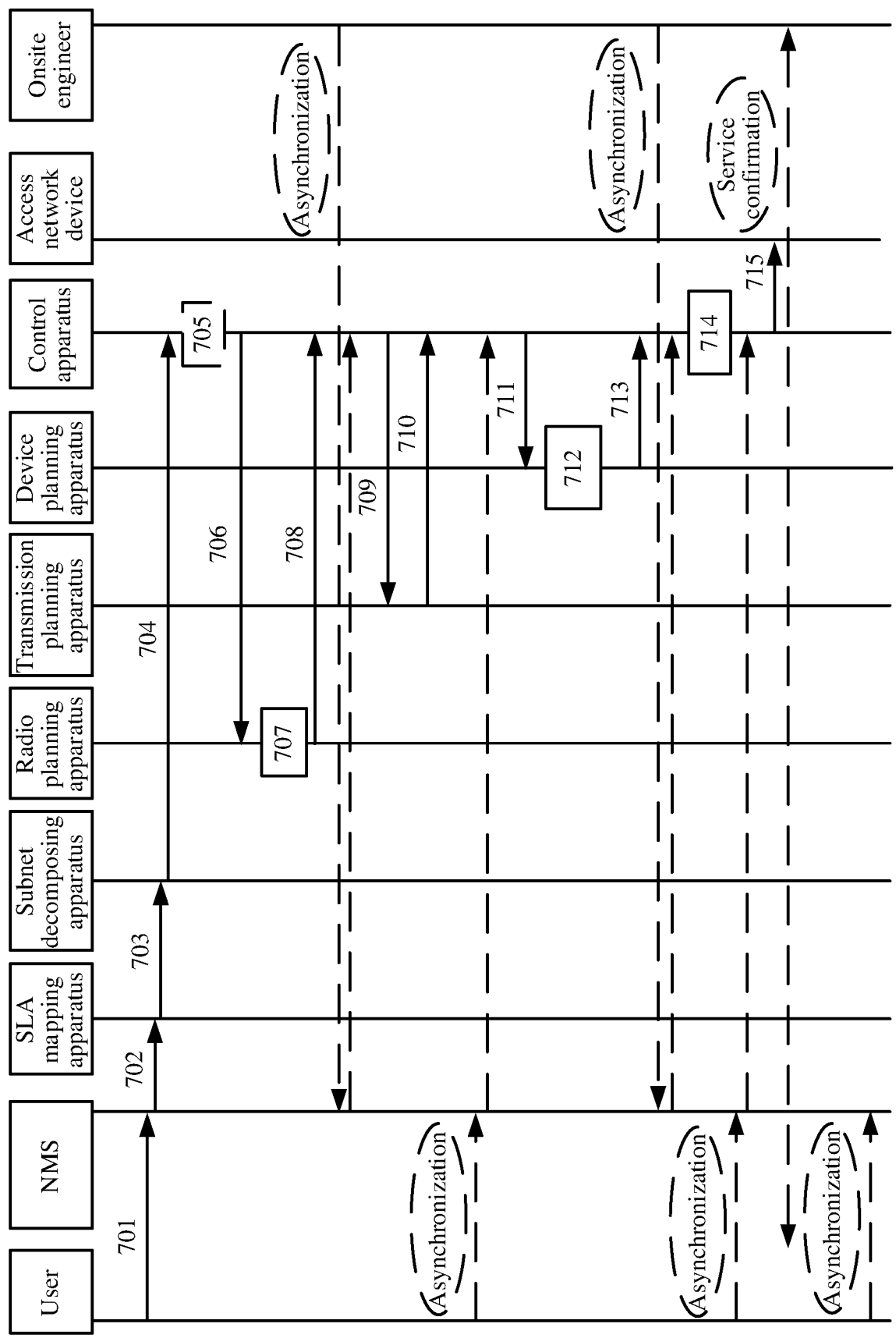
FIG. 7 is a schematic flowchart of a 2B network deployment method according to an embodiment of this application.

With reference to the EMS shown in FIG. 6 and all the foregoing description content, the following describes in detail a deployment procedure of the 2B network provided in an embodiment of this application. FIG. 7 is a schematic flowchart of a 2B network deployment method according to an embodiment of this application. The method includes the following steps.

701: A user sends a user intent to an NMS.

In this embodiment of this application, a manner that a service center obtains the user intent may be that the user goes to the service center, or may be that a remote user sends the user intent to the service center for notification. This is not specifically limited herein.

The user intent is the network intent information in the embodiment shown in FIG. 5 for describing a service requirement of the user. In this case, the network management system NMS receives the network intent information, and generates a network intent in a 2B network based on an intent model. For example, user intent information may include a geographical area that needs to be covered, a quantity of terminal devices, and a service corresponding to the terminal device.

Optionally, the user intent may further include a type of a resource and a device, such as a pRRU type, a CPE type, and a frequency bandwidth. If the user does not specify the type of the resource and the device, a default device model may be selected based on a sales strategy and user service registration, or the type of the resource and the device may be determined in an automatic planning phase based on resources. This is not specifically limited herein. The user intent may further include isolation. The isolation indicates a requirement of a first user, for example, whether a spectrum is exclusive or shared.

702: The NMS sends an SLA mapping request to an SLA mapping apparatus.

After generating a 2B network intent, the NMS sends the SLA mapping request to the SLA mapping apparatus. The SLA mapping request is used to convert the 2B network intent into SLA information of the network.

703: The SLA mapping apparatus sends a network decomposition request to a subnet decomposition apparatus.

After obtaining a user intent in the SLA mapping request, the SLA mapping apparatus converts the 2B network intent into the SLA of the network, that is, converts a user model into a network model, and sends the network decomposition request to the subnet decomposition apparatus.

704: The subnet decomposition apparatus sends a network intent request of a 2B radio access network to a control apparatus.

After receiving the network decomposition request, the subnet decomposition apparatus decomposes SLA requirements of the entire network into an SLA requirement of each subnet, to obtain interworking parameters between subnets: a tracking area code (TAC), an access network device ID, a single network slice selection assistance information (S-NSSAI) identifier, an interworking IP address of a user plane of an access network-core network control plane, and other resources.

After obtaining the SLA requirement of each subnet through decomposition, the subnet decomposition apparatus sends a 2B RAN network intent request to a control apparatus. The 2B RAN network intent request includes the interworking parameters between the subnets.

705: The control apparatus determines a scenario. It may be understood that this step is optional.

Optionally, the control apparatus may determine a scenario first, and then perform step 1006. Determining of the scenario indicates that the control apparatus determines whether a basic resource exists in a geographical area in the SLA information. The basic resource is a resource for enabling another 2B network service for the user before the 2B network corresponding to the network intent is deployed. If the basic resource does not exist in the geographical area, it indicates that the geographical area belongs to initial deployment. If the basic resource exists in the geographical area, impact of an original 2B network on a 2B network to be deployed needs to be considered.

706: The control apparatus sends a radio planning request to a radio planning apparatus.

Optionally, after obtaining the 2B RAN network intent request, the control apparatus may send the radio planning request to the radio planning apparatus. The radio planning request includes SLA information (including a geographical area, a quantity of terminal devices, a first service corresponding to the terminal device, and the like) of the first user.

707: The radio planning apparatus performs radio planning/simulation based on the radio planning request and according to a radio planning policy, to obtain a radio resource.

After receiving the radio planning request sent by the control apparatus, the radio planning apparatus may obtain the radio planning policy, perform radio/simulation based on the radio planning request and the radio planning policy, and determine a radio resource of the user if the simulation succeeds. If the simulation fails, a failure cause (for example, the spectrum is insufficient) is fed back to the control apparatus, and then the SLA information is re-adjusted (that is, a requirement for the first service is modified).

It may be understood that, because the radio planning policy is for network-wide users, the radio planning apparatus may alternatively obtain the radio planning policy before receiving the radio planning request.

708: The radio planning apparatus sends the radio resource to the control apparatus.

The radio apparatus sends the radio resource obtained through simulation to the control apparatus.

Optionally, an onsite engineer may check the radio resource in one step, and confirm or modify the radio resource based on an onsite situation. Specifically, the onsite engineer may confirm, add, or delete information in the radio resource. For example, the onsite engineer may confirm a candidate location of a pRRU, determine which positions cannot be used for installation, which positions can be added for installation, or the like. The radio apparatus re-plans the radio resource based on a location confirmed by the onsite engineer or a new candidate location, until the onsite engineer confirm the radio resource.

709: The control apparatus sends a transmission planning request to a transmission planning apparatus.

After obtaining the radio resource, the control apparatus may send the transmission planning request to the transmission planning apparatus. The transmission planning request includes the SLA information and the radio resource. The transmission planning request is used to plan internal transmission planning of an access network device and transmission planning between the access network device and another network element (for example, another access network device and another core network device) for the user.

710: The transmission planning apparatus sends a transmission resource to the control apparatus.

After receiving the transmission planning request, the transmission planning apparatus may obtain a transmission planning policy, and generate a transmission resource of the first user based on the transmission planning request and the transmission planning policy.

It may be understood that, because the transmission planning policy is for the network-wide users, the transmission planning apparatus may alternatively obtain the transmission planning policy before receiving the transmission planning request.

Optionally, the transmission resource means that an SLA of the RAN network is allocated to a terrestrial transmission network. The terrestrial transmission network is generally for optical fiber transmission, and is defined by a management plane, a control plane, an IP address of the user plane, a route, and the like.

711: The control apparatus sends a device planning request to a device planning apparatus. It may be understood that this step is optional.

Optionally, after receiving the transmission resource, the control apparatus may send the device planning request to the device planning apparatus. The device planning request may include the SLA information, the radio resource, the transmission resource, and the like. The device planning request is used to plan a network topology and the like of a signal processing apparatus for the first user.

712: The device planning apparatus generates the network topology based on the device planning request and according to the device planning policy. It may be understood that this step is optional.

Optionally, after obtaining the device planning request, the device planning apparatus may obtain the device planning policy, and generate the network topology based on the device planning request and according to the device planning policy. The onsite engineer may implement hardware installation based on the network topology. For related descriptions of the network topology, refer to step 809 in the foregoing embodiment shown in FIG. 8. Details are not described herein again.

Optionally, because the device planning policy is for the network-wide users, the device planning apparatus may alternatively obtain the device planning policy before receiving the device planning request.

For example, the device planning apparatus may generate an RRU topology based on geographical locations of an RRU and an antenna. The RRU topology may indicate a quantity of RRU chains, a quantity of rHubs, and a connection relationship between an rHub and an RRU chain.

713: The device planning apparatus sends the network topology to the control apparatus. It may be understood that this step is optional.

Optionally, after generating the network topology, the device planning apparatus sends the network topology to the control apparatus.

714: The control apparatus determines whether an activation condition is met. If the activation condition is met, step 815 is performed. It may be understood that this step is optional.

Optionally, after generating network resources, the control apparatus may determine whether the activation condition is met.

The activation condition may be at least one of the following: a request type of the user is not an estimated quote, a request type of the user is deployment, and/or a request type of the user is deployment and is confirmed by the onsite engineer.

It may be understood that the activation condition is merely an example. In actual application, the activation condition may further include other request types. This is not specifically limited herein.

In other words, if the request type of the first user is the estimated quote, step 715 may not be performed. If the request type of the first user is deployment, step 715 is not performed if no confirmation is performed by the onsite engineer. If confirmation is performed by the onsite engineer, step 715 may be performed.

715: The control apparatus sends configuration information to the access network device. This step is optional.

Optionally, after the control apparatus generates the network resources, if there is a first scenario or a second scenario, the control apparatus generates configuration information based on the network resources. The generating configuration information includes at least one of the following: generating a cell, allocating an ID of a cell, and combining network resources to obtain a resource of a cell, generating an RRU configuration cabinet, subrack, slot number, and name, and the like. In other words, the configuration information is configuration information used in initial deployment of the 2B network or deployment of a "logically independent" 2B network.

After the control apparatus sends the configuration information to the access network device, the access network device may communicate with another network element (another access network device and/or another core network device, and the like).

Optionally, a time sequence for the onsite engineer, the user, or the like to perform asynchronous checking is not limited. If the onsite engineer or the user performs asynchronous checking, a network resource corresponding to an NSSI is displayed to the onsite engineer, the user, or the like. In other words, the onsite engineer, the user, or the like is unaware of an internal change.

In this embodiment of this application, a comprehensive deployment procedure of the 2B network is described. Automatic network deployment is implemented through interaction between network element devices, thereby improving deployment efficiency of the 2B network.

Figure 8:
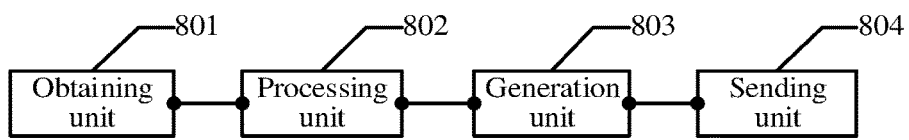
FIG. 8 is a schematic diagram of a structure of a network resource request apparatus according to an embodiment of this application.

FIG. 8 shows a network resource request apparatus according to an embodiment of this application. As shown in FIG. 8, the apparatus includes:

an obtaining unit 801, configured to obtain network intent information of a user, where the network intent information includes quantity information of a terminal device and service requirement information of the terminal device, and the network intent information is used to establish a local area network of the user;

a processing unit 802, configured to perform classification representation on the network intent information based on an intent model, where the intent model includes a terminal device set, a service flow set, and a mapping relationship between the terminal device set and the service flow set, where the terminal device set is used to classify the terminal device, and the service flow set represents the service requirement information;

a generation unit 803, configured to generate service level agreement SLA information based on a representation result of the intent model; and a sending unit 804, configured to send the service level agreement SLA information to an element management system, so that the element management system deploys network resources of an access network for the local area network of the user based on the SLA information.

In an optional implementation, the intent model further includes a geographical area set and a mapping relationship between the terminal device set and the geographical area set. The geographical area set represents a target geographical area of the local area network.

In an optional implementation, the geographical area set further includes a sub-area set. The sub-area set represents a local sub-area in the target geographical area.

In an optional implementation, the terminal device set further includes a sub-device set. The intent model further includes a mapping relationship between the sub-device set and the sub-area set.

In an optional implementation, the processing unit 802 is specifically configured to: classify the terminal device based on the service requirement information of the terminal device, to determine the terminal device set, where service requirement information corresponding to each terminal device in the terminal device set is the same; and establish a first identifier name for the terminal device set, where the first identifier name marks the terminal device set.

In an optional implementation, the processing unit 802 is specifically configured to: determine a plurality of services in the service flow set based on the service requirement information of the terminal device; and establish a second identifier name for each of the plurality of services, where the second identifier name marks the service.

In an optional implementation, the network intent information further includes geographical location information of the local area network. The processing unit 802 is specifically configured to: determine first location information of the target geographical area in the geographical area set based on the geographical location information of the local area network; and establish a third identifier name for the geographical area set, where the third identifier name marks the geographical area set.

In an optional implementation, the network intent information further includes geographical location information of the terminal device. The processing unit 802 is specifically configured to: determine second location information of the local sub-area in the sub-area set based on the geographical location information of the terminal device; and establish a third identifier name for the sub-area set, where the third identifier name marks the sub-area set.

In an optional implementation, the processing unit 802 is specifically configured to: classify, in each terminal device set based on the geographical location information of the terminal device included in the terminal device set, the terminal device included in the terminal device set, to determine the sub-device set; and establish a fourth identifier name for the sub-device set, where the fourth identifier name marks the sub-device set.

In an optional implementation, the processing unit 802 is specifically configured to: determine, in each terminal device set, a target service of the plurality of services based on the service requirement information of the terminal device included in the terminal device set; and establish a correspondence between the first identifier name of the terminal device set and a second identifier name of the target service.

In an optional implementation, the processing unit 802 is specifically configured to: determine, in each sub-device set based on geographical location information of a terminal device included in the sub-device set, a sub-area set corresponding to the sub-device set; and establish a correspondence between the fourth identifier name of the sub-device set and the third identifier name of the sub-area set. In an optional implementation, the processing unit 802 is further configured to determine target quantity information of the terminal device set and/or the sub-device set based on the quantity information of the terminal device.

In an optional implementation, the SLA information includes information about the terminal device set, information about the service flow set, information about the geographical area set, information about the mapping relationship between the terminal device set and the service flow set, and information about the mapping relationship between the terminal device set and the geographical area set.

Figure 9:
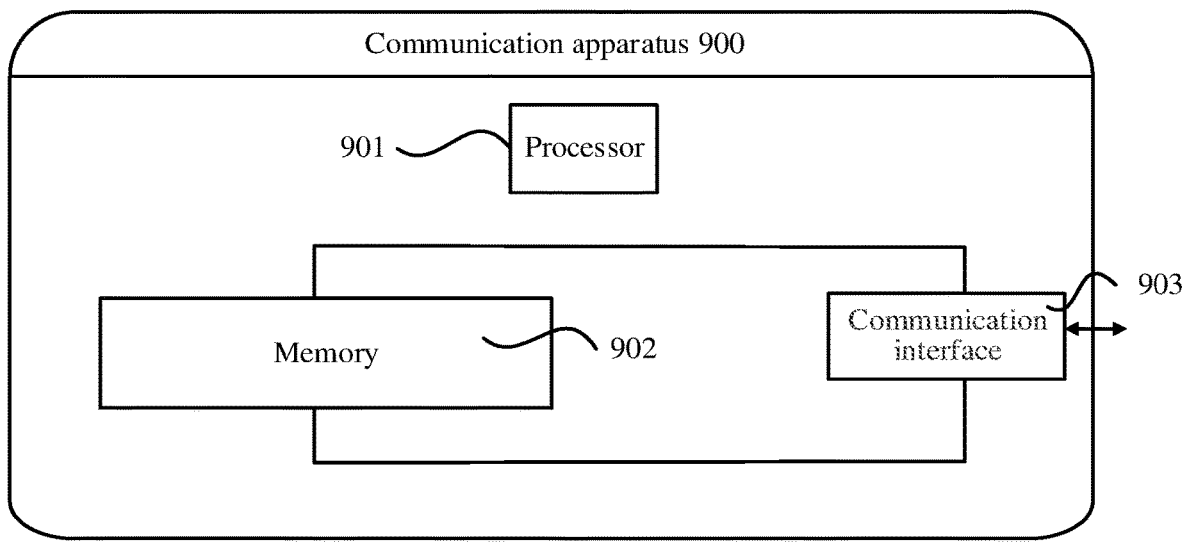
FIG. 9 is a schematic diagram of a structure of a communication apparatus according to an embodiment of this application.

FIG. 9 is a schematic diagram of a structure of a communication apparatus 900 according to an embodiment of this application. The communication apparatus 900 includes a processor 901, a memory 902, and a communication interface 903.

The processor 901, the memory 902, and the communication interface 903 are connected to each other through the bus. The bus may be a peripheral component interconnect (PCI for short) bus, an extended industry standard architecture (EISA for short) bus, or the like. The bus may be classified into an address bus, a data bus, a control bus, and the like. For ease of representation, only one thick line is used for representation in FIG. 9, but this does not indicate that there is only one bus or only one type of the bus.

The memory 902 may include a volatile memory, for example, a random access memory (RAM). Alternatively, the memory may include a non-volatile memory, for example, a flash memory, a hard disk drive (HDD), or a solid-state drive (SSD). The memory 902 may further include a combination of the types of memories.

The processor 901 may be a central processing unit (CPU), a network processor (NP), or a combination of a CPU and an NP. The processor 902 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The communication interface 903 may be a wired communication interface, a wireless communication interface, or a combination thereof. For example, the wired communication interface may be an Ethernet interface. The Ethernet interface may be an optical interface, an electrical interface, or a combination thereof. The wireless communication interface may be a WLAN interface, a cellular network communication interface, a combination thereof, or the like.

Optionally, the memory 902 may be further configured to store program instructions. The processor 901 invokes the program instructions stored in the memory 902, so that the communication apparatus 900 implements a function of the network resource request apparatus in the foregoing method. Details are not described herein again.

An embodiment of this application further provides a chip or a chip system. The chip or the chip system includes at least one processor and a communication interface. The communication interface and the at least one processor are interconnected through a line. The at least one processor runs instructions or a computer program to perform one or more steps in the method embodiment shown in FIG. 5 or an optional implementation thereof, to implement a function of the network resource request apparatus in the foregoing method.

The communication interface in the chip may be an input/output interface, a pin, a circuit, or the like.

In a possible implementation, the chip or the chip system further includes at least one memory. The at least one memory stores instructions. The memory may be a storage unit inside the chip, for example, a register or a cache, or may be a storage unit (for example, a read-only memory, a random access memory) of the chip.

An embodiment of this application further provides a computer storage medium. The computer storage medium stores computer program instructions that implement a function of a network device in a path verification method provided in embodiments of this application.

An embodiment of this application further provides a computer storage medium. The computer storage medium stores computer program instructions that implement the network resource request method provided in embodiments of this application.

An embodiment of this application provides a computer program product. The computer program product includes computer software instructions. The computer software instructions may be loaded by a processor to implement a procedure in the network resource request method shown in FIG. 5.

All or a part of the foregoing embodiments may be implemented through software, hardware, firmware, or any combination thereof. When the software is used for implementation, all or a part of the foregoing embodiments may be implemented in a form of a computer program product.

It may be clearly understood by a person skilled in the art that, for the purpose of convenient and brief description, for a detailed working process of the system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely a logical function division and may be another division in actual implementation. For example, a plurality of units or components may be combined or integrated into another system, or some features may be ignored or not performed. In addition, displayed or discussed mutual coupling or direct coupling or communication connection may be implemented through some interfaces. Indirect coupling or communication connection between an apparatus or a unit may be implemented in an electronic, a mechanical, or another form.

The units described as separate components may or may not be physically separate. Components displayed as units may or may not be physical units, that is, may be located in one location, or may be distributed on a plurality of network units. A part of or all of the units may be selected based on an actual requirement to achieve an objective of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

If the integrated unit is implemented in the form of the software functional unit, and sold or used as an independent product, the integrated unit may be stored in a computer-readable storage medium. Based on such an understanding, the technical solutions of this application essentially, or the part contributing to the conventional technology, or all or a part of the technical solutions may be implemented in a form of a software product. The computer software product is stored in a storage medium, and includes several instructions for instructing a computer device (which may be a personal computer, a server, or a network device) to perform all or a part of the steps of the methods in embodiments of this application. The storage medium includes any medium that can store program code, such as a USB flash drive, a removable hard disk, a read-only memory (ROM), a random access memory (RAM), a magnetic disk, or an optical disc.

What is claimed is:

1. A method, wherein the method comprises:
obtaining network intent information of a user, wherein the network intent information comprises quantity information of a terminal device and service requirement information of the terminal device, and the network intent information corresponds to a local area network of the user;
performing classification representation on the network intent information based on an intent model, wherein the intent model comprises a terminal device set, a service flow set, and a mapping relationship between the terminal device set and the service flow set, wherein the terminal device is classified based on the terminal device set, and the service flow set represents the service requirement information;
generating service level agreement (SLA) information based on a representation result of the intent model; and
sending the SLA information to an element management system, wherein the element management system deploys network resources of an access network for the local area network of the user based on the SLA information.

2. The method according to claim 1, wherein the intent model further comprises a geographical area set and a mapping relationship between the terminal device set and the geographical area set, and the geographical area set represents a target geographical area of the local area network.

3. The method according to claim 2, wherein the geographical area set further comprises a sub-area set, and the sub-area set represents a local sub-area in the target geographical area.

4. The method according to claim 3, wherein the terminal device set further comprises a sub-device set, and the intent model further comprises a mapping relationship between the sub-device set and the sub-area set.

5. The method according to claim 3, wherein the network intent information further comprises geographical location information of the terminal device, and the performing classification representation on the network intent information based on an intent model comprises:
determining second location information of the local sub-area in the sub-area set based on the geographical location information of the terminal device; and
establishing a fourth identifier name for the sub-area set, wherein the fourth identifier name marks the sub-area set.

6. The method according to claim 5, wherein the performing classification representation on the network intent information based on an intent model comprises:
classifying, in each terminal device set based on the geographical location information of the terminal device comprised in the terminal device set, the terminal device comprised in the terminal device set, to determine a sub-device set; and
establishing a fifth identifier name for the sub-device set, wherein the fifth identifier name marks the sub-device set.

7. The method according to claim 6, wherein the performing classification representation on the network intent information based on an intent model comprises:
determining, in each sub-device set based on the geographical location information of the terminal device comprised in the sub-device set, the sub-area set corresponding to the sub-device set; and
establishing a correspondence between the fifth identifier name of the sub-device set and the fourth identifier name of the sub-area set.

8. The method according to claim 2, wherein the network intent information further comprises geographical location information of the local area network, and the performing classification representation on the network intent information based on an intent model comprises:
determining first location information of the target geographical area in the geographical area set based on the geographical location information of the local area network; and
establishing a third identifier name for the geographical area set, wherein the third identifier name marks the geographical area set.

9. The method according to claim 1, wherein the performing classification representation on the network intent information based on an intent model comprises:
classifying the terminal device based on the service requirement information of the terminal device, to determine the terminal device set, wherein each terminal device in the terminal device set corresponds to the same service requirement information; and
establishing a first identifier name for the terminal device set, wherein the first identifier name marks the terminal device set.

10. The method according to claim 1, wherein the performing classification representation on the network intent information based on an intent model comprises:
determining a plurality of services in the service flow set based on the service requirement information of the terminal device; and
establishing a second identifier name for each service of the plurality of services, wherein the second identifier name marks the service.

11. The method according to claim 10, wherein the performing classification representation on the network intent information based on an intent model comprises:
determining, in each terminal device set, a target service of the plurality of services based on the service requirement information of the terminal device comprised in the terminal device set; and
establishing a correspondence between the first identifier name of the terminal device set and a second identifier name of the target service.

12. The method according to claim 11, wherein the method further comprises:
determining target quantity information of at least one of the terminal device set or the sub-device set based on the quantity information of the terminal device.

13. The method according to claim 1, wherein the SLA information comprises at least one of information about the terminal device set, information about the service flow set, information about the geographical area set, information about the mapping relationship between the terminal device set and the service flow set, or information about the mapping relationship between the terminal device set and the geographical area set.

14. A network resource request apparatus, wherein the network resource request apparatus comprises at least one processor and at least one memory coupled to the at least one processor, wherein the at least one memory stores programming instructions for execution by the at least one processor to cause the network resource request apparatus to perform operations comprising:
   obtaining network intent information of a user, wherein the network intent information comprises quantity information of a terminal device and service requirement information of the terminal device, and the network intent information corresponds to a local area network of the user;
   performing classification representation on the network intent information based on an intent model, wherein the intent model comprises a terminal device set, a service flow set, and a mapping relationship between the terminal device set and the service flow set, wherein the terminal device is classified based on the terminal device set, and the service flow set represents the service requirement information;
   generating service level agreement (SLA) information based on a representation result of the intent model; and
   sending the SLA information to an element management system, wherein the element management system deploys network resources of an access network for the local area network of the user based on the SLA information.

15. The network resource request apparatus according to claim 14, wherein the intent model further comprises a geographical area set and a mapping relationship between the terminal device set and the geographical area set, and the geographical area set represents a target geographical area of the local area network.

16. The network resource request apparatus according to claim 15, wherein the geographical area set further comprises a sub-area set, and the sub-area set represents a local sub-area in the target geographical area.

17. The network resource request apparatus according to claim 16, wherein the terminal device set further comprises a sub-device set, and the intent model further comprises a mapping relationship between the sub-device set and the sub-area set.

18. The network resource request apparatus according to claim 14, wherein the operations further comprise:
   classifying the terminal device based on the service requirement information of the terminal device, to determine the terminal device set, wherein each terminal device in the terminal device set corresponds to the same service requirement information; and
   establishing a first identifier name for the terminal device set, wherein the first identifier name marks the terminal device set.

19. The network resource request apparatus according to claim 14, wherein the operations further comprise:
   determining a plurality of services in the service flow set based on the service requirement information of the terminal device; and
   establishing a second identifier name for each service of the plurality of services, wherein the second identifier name marks the service.

20. A non-transitory computer-readable storage medium storing computer-executable instructions for execution by at least one processor of an apparatus to cause the apparatus to perform operations comprising:
   obtaining network intent information of a user, wherein the network intent information comprises quantity information of a terminal device and service requirement information of the terminal device, and the network intent information corresponds to a local area network of the user;
   performing classification representation on the network intent information based on an intent model, wherein the intent model comprises a terminal device set, a service flow set, and a mapping relationship between the terminal device set and the service flow set, wherein the terminal device is classified based on the terminal device set, and the service flow set represents the service requirement information;
   generating service level agreement (SLA) information based on a representation result of the intent model; and
   sending the SLA information to an element management system, wherein the element management system deploys network resources of an access network for the local area network of the user based on the SLA information.

* * * * *